Oct. 4, 1966  E. V. OMAN  3,276,565
AUTOMATIC ORIENTING MECHANISM
Filed Jan. 11, 1965  4 Sheets-Sheet 1
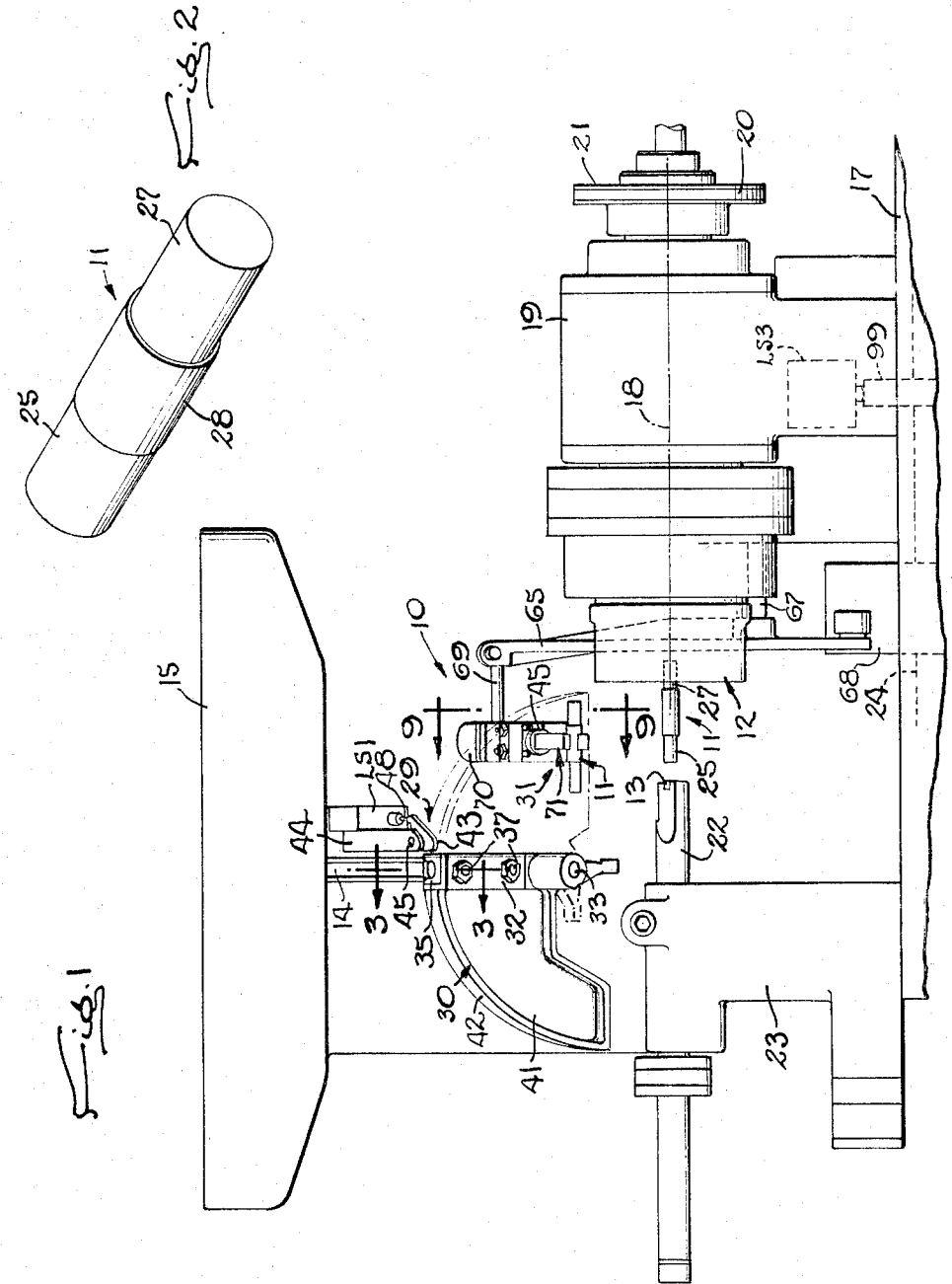
INVENTOR
Edwin V. Oman
by Wolfe, Hubbard, Voit & Osann
ATTORNEY

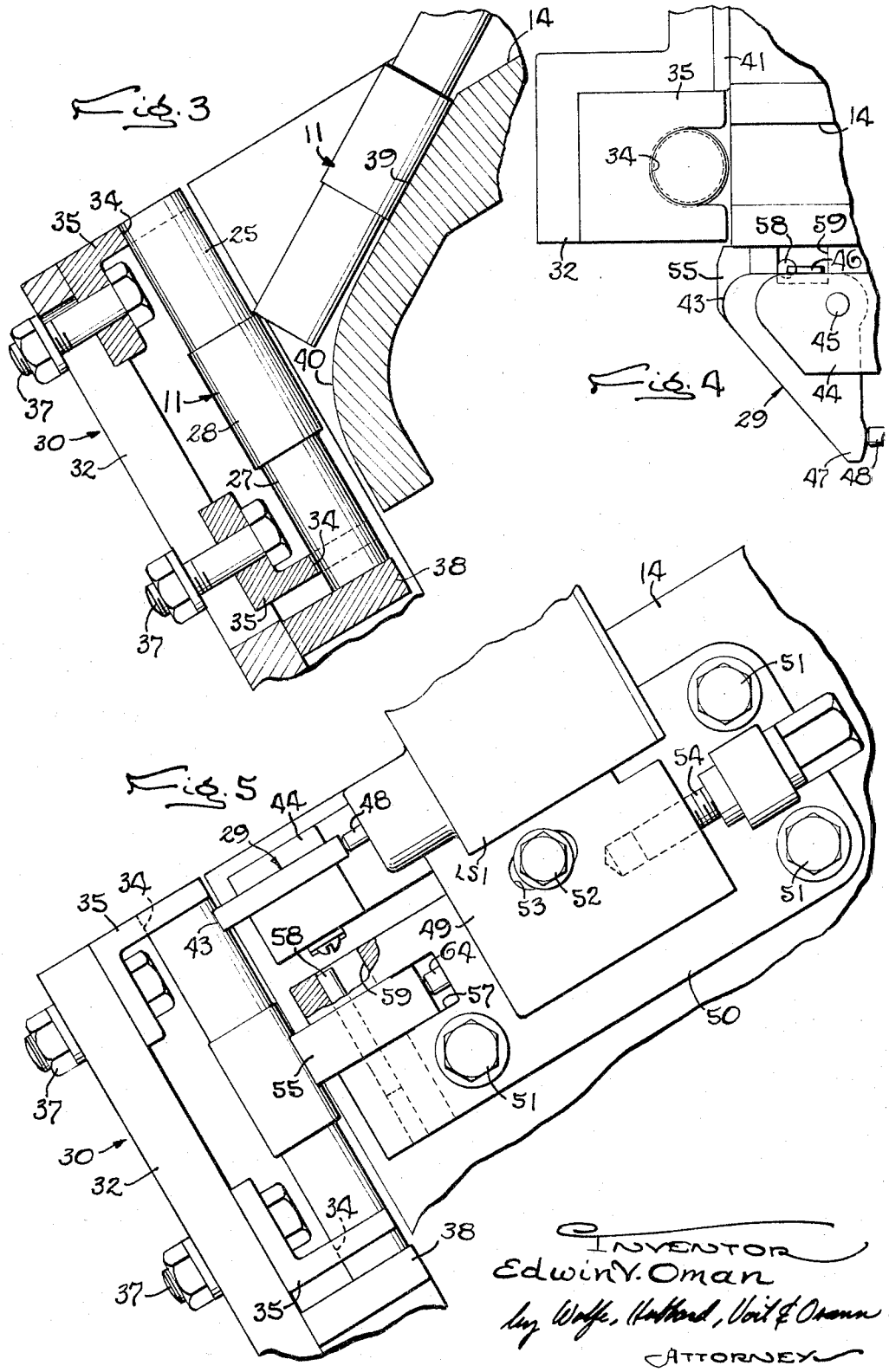

Oct. 4, 1966 E. V. OMAN 3,276,565
AUTOMATIC ORIENTING MECHANISM
Filed Jan. 11, 1965 4 Sheets-Sheet 3
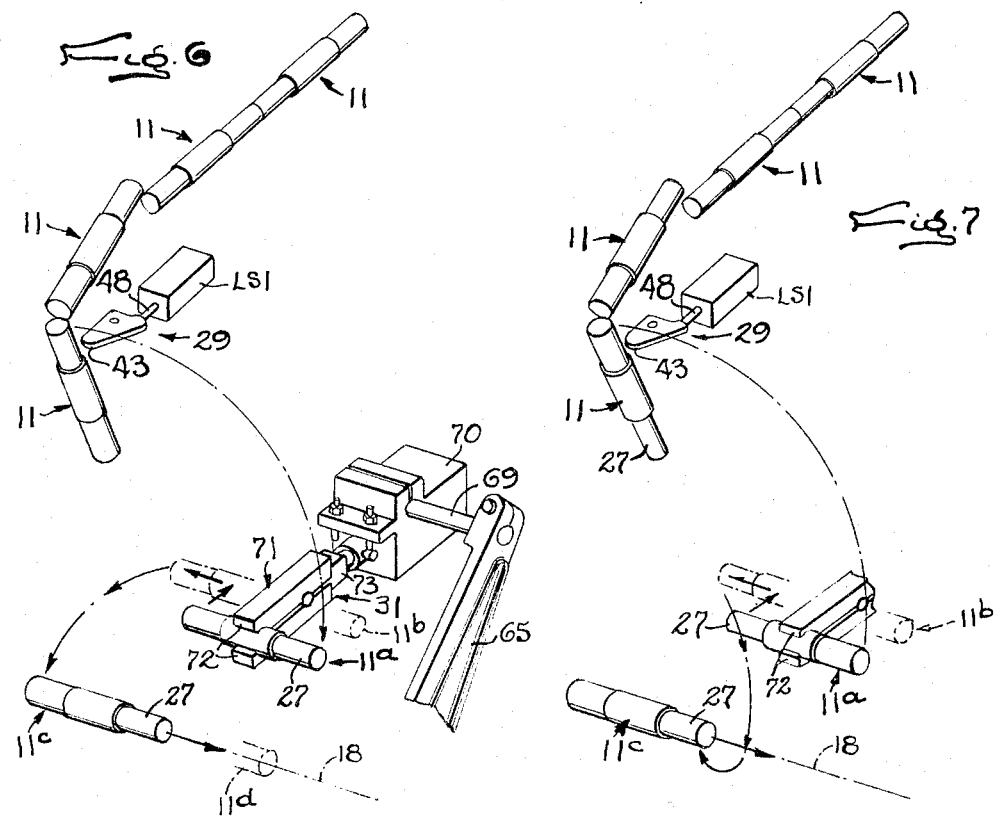
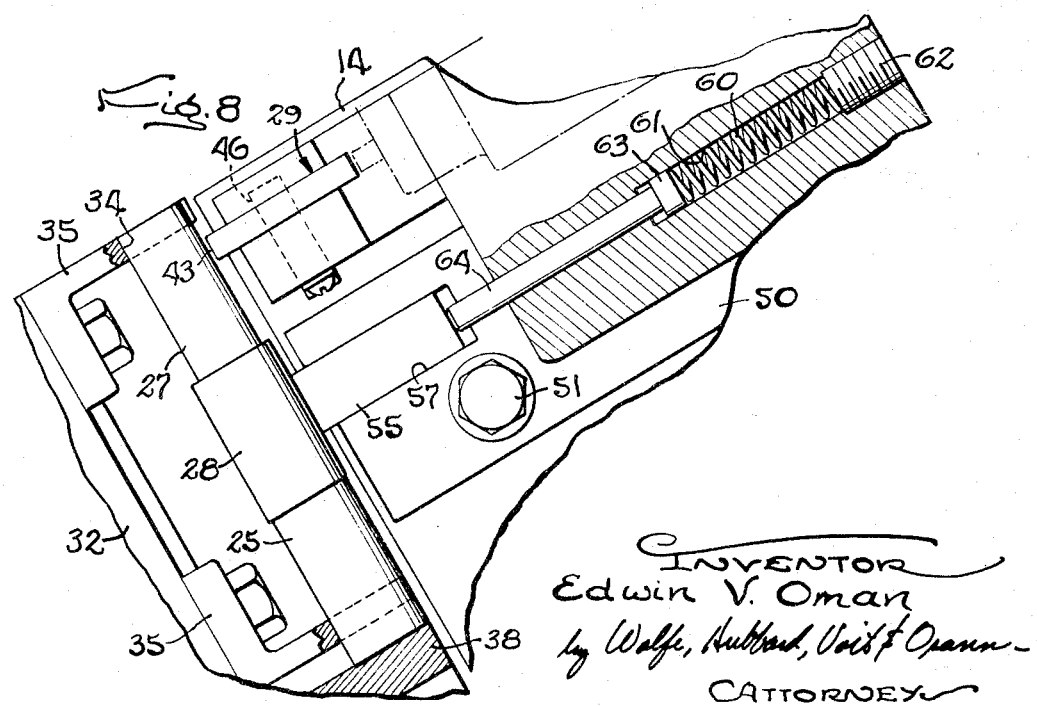
INVENTOR
Edwin V. Oman
by Wolfe, Hubbard, Voit & Osann
ATTORNEYS

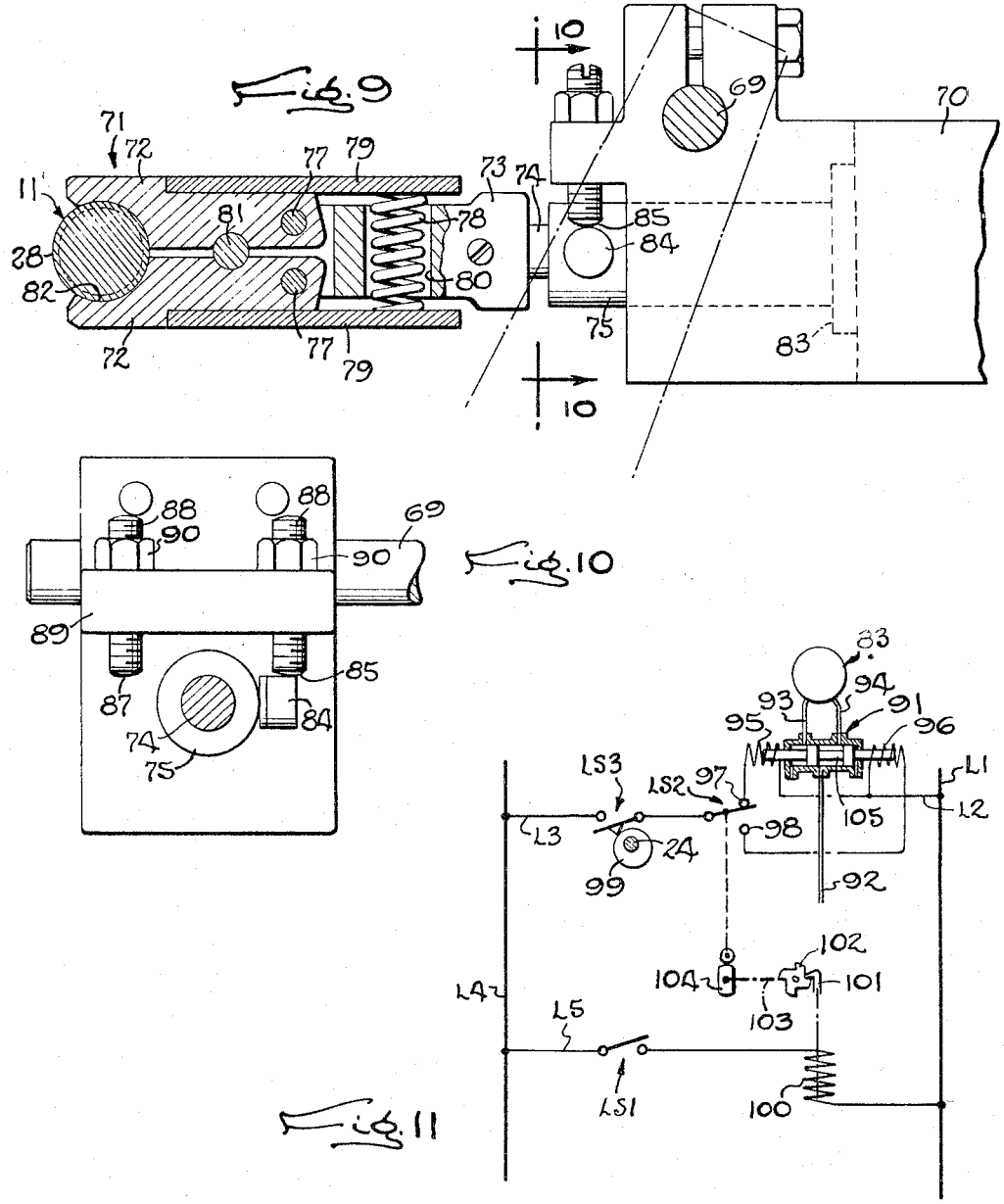

United States Patent Office 3,276,565
Patented Oct. 4, 1966

3,276,565
AUTOMATIC ORIENTING MECHANISM
Edwin V. Oman, Rockford, Ill., assignor to Rockford Screw Products Co., Rockford, Ill., a corporation of Illinois
Filed Jan. 11, 1965, Ser. No. 424,512
7 Claims. (Cl. 198—33)

This invention relates to mechanism for handling elongated parts having opposite end portions of different configuration and, more particularly, to a transfer mechanism for orienting such parts with the ends in a predetermined relation for a machining operation automatically as an incident to the transfer of the parts to the machining station. As used herein, "different configuration" is intended to include detectable variations in size as well as in cross-sectional shape and contour.

The general object of the present invention is to eliminate the need for visual inspection and manual handling of parts that previously have required such inspection and handling for orientation.

A more specific object is to detect or sense the relative positions of the ends of each such part automatically during a portion of the transfer operation and subsequently turn end for end only those parts which are out of the desired position thereby bringing all the parts into the same position.

Other objects and advantages of the invention will become apparent from the following detailed description taken in connection with the accompanying drawings, in which—

FIGURE 1 is a fragmentary side elevational view of a machine provided with an automatic orienting mechanism embodying the novel features of the present invention.

FIG. 2 is an enlarged perspective view of a part adapted to be oriented by the automatic orienting mechanism.

FIG. 3 is an enlarged fragmentary cross-sectional view taken substantially along the line 3—3 of FIG. 1.

FIG. 4 is a fragmentary plan view taken at the top of the parts shown in FIG. 3.

FIG. 5 is a fragmentary side elevational view of the parts in FIG. 4, partly broken away and shown in section.

FIG. 6 is a schematic view illustrating the steps in the transfer of parts.

FIG. 7 is a view similar to FIG. 6 illustrating the turning of a disoriented part during the transfer.

FIG. 8 is a fragmentary cross-sectional view similar to FIG. 5 with the parts in moved positions and additional parts shown in section.

FIG. 9 is an enlarged fragmentary cross-sectional view taken substantially along the line 9—9 of FIG. 1 with parts broken away and shown in section.

FIG. 10 is a fragmentary cross-sectional view taken along the line 10—10 of FIG. 9.

FIG. 11 is a diagrammatic view of the primary components of the electrical control circuit for the orienting mechanism.

As shown in the drawings for purposes of illustration, the invention is embodied in the transfer mechanism 10 of a machine for positioning one end of a part 11 in a chuck 12 by which the part is rotated while the projecting outer end of the part is machined by a tool 13. After each machining operation, the part is ejected from the chuck and another part is inserted therein by the transfer mechanism which is fed by a downwardly inclined chute 14 carrying a succession of parts from a supply hopper 15.

In this instance, the chuck 12 is journaled on the machine base 17 for rotation about a horizontal axis 18 in bearings (not shown) in a sleeve 19 (FIG. 1) disposed above the base and is rotated by a motor (not shown) driving a V-belt 20 trained around a pulley 21 on the chuck spindle on the right side of the sleeve. As shown in FIG. 1, the tool 13 is carried on an elongated bar 22 slidably supported on a post 23 upstanding from the left end of the base, the bar being slidable endwise back and forth relative to the post to reciprocate the tool along a path parallel to the axis 18 and feed the tool into and out of cutting engagement with the projecting end of the rotating part 11 to perform a pointing operation on the outer end of the part. Reciprocation of the tool bar 22 and opening and closing of the chuck are controlled by a set of axially spaced cams on an elongated continuously rotating camshaft 24 journaled on the base generally as shown in broken lines in FIG. 1 with the axis of the shaft parallel to the axis of rotation of the part. The chuck, the hopper, the tool slide and the associated machine parts may be of well known construction and operation and thus are shown and described only generally herein.

The illustrative part 11 is a double-ended stud blank (see FIG. 2) having coaxial cylindrical end portions 25 and 27 slightly smaller in diameter than the central body portion 28 of the blank. Both of the end portions are to be threaded for insertion in tapped holes in two parts to be joined together by such studs. One end portion 27 of the blank is made slightly smaller in diameter than the other end portion 25 for the eventual formation of different types of threads on the opposite end portions of the blank.

On the chute 14, the blanks 11 are arranged in a single file and in end-to-end relation as shown in FIGS. 6 and 7 to slide endwise down the chute to the transfer mechanism 10. With the blanks being fed at random onto the chute, some of the blanks slide down the chute with their smaller ends 27 in advance and the rest of the blanks are positioned with their larger ends 25 in advance. Prior to insertion of the blanks in the chuck 12, however, all of the blanks must be arranged in the same relation for insertion of corresponding ends in the chuck. Herein, the smaller end portion of each blank is inserted in the chuck and the tool 13 operates on the larger end portion. Heretofore, because of the absence of a head or flange of substantial size for use in automatic orientation, the orientation of parts of this type has been accomplished manually after visual inspection of the parts to distinguish between the ends.

In accordance with the present invention, the relative positions of the two different end portions 25 and 27 of each blank 11 are sensed or detected by a feeler 29 prior to insertion of the part in the chuck 12 and each improperly positioned or disoriented blank is rotated automatically end for end as an incident to the transfer to the chuck thereby bringing all the blanks into the proper position for insertion of the smaller end in the chuck. Blanks that are properly oriented prior to the transfer simply are transferred to the chuck without turning. Accordingly, the smaller end of each part is inserted in the chuck, regardless of the position of the blank as it descends the chute 14.

In the present instance, the transfer mechanism 10 handles the blanks in two steps. First, the blanks discharged from the chute 14 are received in a shuttle 30 mounted on the machine base 17 for back and forth movement in a plane extending transversely of the chute to receive successive blanks and carry the blanks sidewise away from the chute to a laterally spaced transfer position shown at 11ᵃ in FIGS. 6 and 7. Then the blanks are picked up by a transfer device 31 for movement to and insertion in the chuck 12.

As shown in FIG. 1, the shuttle 30 is pivoted on the machine base 17 below the discharge end of the chute 14 for back and forth oscillation across the end of the chute and comprises a radially extending upright arm 32 secured at its lower end to a pin 33 journaled on the base with a seat or cradle formed on the side of the arm adjacent the chute by alined notches 34 (FIGS. 3 and 4) in two lugs 35 secured to the arm by bolts 37 and projecting away from the arm toward the chute. The cradle is alined with the chute in one position of the shuttle (FIG. 4) to receive a blank discharged from the chute, and supports the blank as shown in FIG. 3 with the lower end of the blank resting on a foot 38 projecting away from the arm beneath the lower lug 35. The shuttle arm 32 is inclined upwardly and to the left as viewed in FIGS. 3 and 5 at an angle on the order of thirty degrees with the vertical, and the lower end of the chute is shaped to tip each blank into the notches 34 as the blank is discharged from the chute. For this purpose, the bottom wall of the chute is inclined downwardly at 39 adjacent its lower end to tip the blanks upwardly as they approach the lower end, and then curves sharply down at 40 to tilt the blanks into upright positions and into the shuttle as they slide off the chute. Both the bottom and the side walls of the chute terminate closely adjacent the inclined plane of oscillation of the shuttle.

As the shuttle 30 swings clockwise (FIG. 1) from the loading position, a face plate 41 generally in the shape of a quarter circle blocks the disccharge end of the chute. The face plate is secured to one side of the arm and projects to the left therefrom in the plane of oscillation of the shuttle arm to move with the arm and form a gate which closes the chute until the cradle is returned to its loading position in alinement with the chute. Preferably, the face plate is backed by a rib 42 which is secured at its ends to the arm and extends around the periphery of the plate.

During the initial transfer, the longitudinal axes of the blanks 11 are turned ninety degrees from upright positions in the plane of the chute 14 to horizontal positions parallel to the axis 18 of the chuck 12. Moreover, the relative positions of the end portions 25, 27 of each blank are detected during the sidewise movement of the blanks on the shuttle 30 by the feeler 29 which is disposed along the path followed by one end portion, herein the upper end portion at the beginning of the shuttle stroke. When the smaller end is up, the blank is properly oriented for insertion in the chuck. If the larger end is up, the blank is disoriented and must be turned end for end prior to insertion.

In this instance, the feeler 29 is a switch operator in the form of a flat, generally triangular plate disposed in a plane perpendicular to the plane of oscillation of the shuttle 30 and formed with a rounded nose 43 closely adjacent the path followed by the upper end of a blank in the cradle notches 34. As shown in FIGS. 1 and 4, the feeler is loosely disposed between and projects outwardly beyond the legs of a forked holder 44 positioned alongside the lower end of the chute 14, and is pivoted adjacent one corner of the triangle on the holder by means of a pin 45 extending through the plate and fast at its opposite ends on the holder legs. The normal position of the nose 43 is such that the smaller end portion 27 of a blank will pass the feeler without touching the nose (see FIG. 8) thus, in effect, signaling that the blank is properly oriented for eventual insertion in the chuck 12. When the larger end portion 25 of a blank is presented to the feeler, however, it engages the nose in passing and rocks the feeler counterclockwise out of the normal position shown in FIG. 4. This moves the nose away from the shuttle 30 and swings one corner 47 of the triangular plate to the right to depress the actuating button 48 of a switch LS1 which thus senses the feeler movement and signals that a disoriented blank is on the shuttle. The feeler plate is held yieldably in the position shown in FIG. 4 by a return spring (not shown) acting on the actuator button to urge the latter outwardly and rotate the plate clockwise into engagement with a suitable stop 46 (FIG. 4) formed in this instance by a flat spring secured to the lower side of the holder 44 (see FIG. 5) and bent upwardly along one side of the holder (see FIG. 4).

As shown most clearly in FIG. 5, the switch LS1 and the forked feeler holder 44 are carried on a slide 49 on a mounting block 50 fastened to the side of the chute 14 adjacent the lower end of the latter by bolts 51. The slide is secured to the block by means of a bolt 52 threaded into the block through a slot 53 in the slide permitting adjustment of the slide and hence the feeler toward and away from the shuttle by means of an adjusting screw 54.

To insure that each blank 11 is seated in the cradle notches 34 prior to passing the feeler, a spring-loaded plunger 55 (FIGS. 4, 5 and 8) is positioned along the path followed by blanks on the shuttle to engage each blank and press it firmly into the cradle notches. As shown in FIG. 5, the plunger is slidably guided in an elongated passage 57 formed in the mounting block 50, the passage being perpendicular to the plane of oscillation of the shuttle 30. A pin 58 projects both upwardly and downwardly from the plunger into slots 59 in the block elongated in the direction of movement of the plunger to form a lost motion connection between the plunger and the block, thus preventing outward movement of the plunger beyond the extended position shown in FIG. 5 in which the pin abuts against the outer ends of the slots. A coiled spring 60 (FIG. 8) fitted in a bore 61 in the block is compressed between a plug 62 and the head 63 of a pin 64 engaging the inner end of the plunger to urge the pin outwardly toward the plunger and hold the plunger yieldably in its extended position. Thus, as each blank passes the plunger, the latter engages the blank and yields inwardly as shown in FIG. 8 while pressing the blanks into the cradle notches.

When each blank on the shuttle 30 reaches the transfer position shown at 11ª in FIGS. 6 and 7, it is picked out of the cradle notches 34 by the transfer device 31 which not only carries the blank to the chuck 12 but also turns the blank end for end when necessary to position the smaller end for insertion in the chuck. For this purpose, the transfer device is mounted on an upright carrier arm 65 fulcrumed intermediate its ends on the machine base by means of a shaft 67 (FIG. 1) projecting outwardly from the base below and to one side of the chuck. The lower end of the arm is disposed alongside a cam 68 on the camshaft 24 with the upper end portion of the arm extending upwardly on one side of the chuck.

On the free end of a pin 69 projecting laterally from the upper end of the arm is a box-like body 70 which carries a gripper 71 (see FIG. 9) for receiving and holding a blank. Under the control of the cam 68, the gripper swings forwardly toward the blank in the receiving position 11ª to engage and grip the blank, then is retracted to an out-of-the-way position 11ᵇ as the shuttle returns to the left (FIG. 1), and finally swings forwardly to an extended position 11ᶜ in which the blank is axially alined with the chuck. Finally, the carrier arm is shifted to the right by endwise movement of the shaft 67 to insert the blank in the chuck at 11ᵈ. These motions are repeated during each cycle of the machine.

In this instance, the gripper 71 is formed by two jaws or fingers 72 (see FIG. 9) disposed in side-by-side generally parallel relation on the forward end of a bar 73 rotatably mounted on the body 70 by means of a rod 74 clamped at one end in a bore in the bar and telescoped at the other end into a sleeve 75 journaled in the body for rotation about its longitudinal axis. The gripping fingers are pivoted adjacent their rear ends on the bar for swinging movement about parallel horizontal axes defined by pins 77 on the bar, and the forward ends of the fingers are urged yieldably toward each other by a coiled spring 78 compressed between two plates 79 secured to the fingers and projecting rearwardly therefrom. The spring extends loosely through a transverse bore 80 in the bar.

Normally, the forward end portions of the fingers are spaced as shown in FIG. 9 with their adjacent sides abutting against a spacer pin 81 disposed between the fingers. At their forward ends, the adjacent sides of the fingers are machined to form a part-cylindrical seat 82 opening forwardly through a mouth narrower than the diameter of the blank bodies 28. Upon engagement of the gripper with a blank during forward motion of the gripper toward the shuttle, the blank cams the fingers apart to open the mouth sufficiently to admit the blank into the seat with the longitudinal axis of the blank perpendicular to the axis of rotation of the gripper. Then the spring 78 closes the gripper about the blank to hold the latter as it is withdrawn from the cradle notches 34 and transferred to the chuck 12.

As the transfer device 31 swings forwardly to bring each blank into axial alignment with the chuck 12, those parts that have been delivered to the transfer device in disoriented positions, that is, with the larger portion 25 projecting to the right toward the chuck, are turned end for end and thus oriented for insertion of the smaller end portion 27 in the chuck. This is accomplished, in response to signals from the feeler 29, by a selectively operable rotary motor, indicated generally at 83 in FIG. 11, mounted on the body 70 and drivingly connected to the sleeve 75. When actuated, this motor rotates the sleeve and the gripper 180 degrees. One such motor is that sold by Ex-Cell-O Corporation, Greenville, Ohio, as Rotac Model S-125 IV.

Fast on and projecting radially from the sleeve 75 adjacent the body 70 is a detent 84 which cooperates with two adjustable stops 85 and 87 in limiting the rotation of the gripper in both directions. Herein, the stops are formed by the ends of two studs 88 threaded through a mounting bracket 89 projecting forwardly from the body above the sleeve 75 and positioned to engage the detent 84 after 180 degrees of rotation of the detent in either direction. Nuts 90 threaded onto the studs above the bracket lock the studs adjustably in place in the bracket.

The basic arrangement for utilizing the signals produced by the feeler 29 to actuate the rotary motor 83 is shown diagrammatically in FIG. 11 and comprises a solenoid-operated valve 91 for controlling the flow of air under pressure from a supply line 92 to one or the other of two lines 93 and 94 connected to opposite sides of the motor. One end of each solenoid coil 95, 96 is connected to a power line L1 through a line L2, and the other ends of the coils are connected to the spaced contacts 97 and 98 of a two-pole switch LS2 in a line L3 connected to the second power line L4. Interposed between the power line and the switch LS2 is a switch LS3 which is closed once during each machine cycle by an eccentric cam 99 on the main camshaft 24 while a blank is held in the gripper 71. The feeler switch LS1 is in a line L5 connected across the power lines L1 and L4 through a solenoid 100 and, when closed, energizes the solenoid to draw a pawl 101 downwardly and turn a ratchet wheel 102 and its supporting shaft 103 one step, 90 degrees in this instance and clockwise as viewed in FIG. 11, thereby turning a cam 104 on the shaft through the same arc. This cam reverses the condition of the two-pole switch LS2 relative to its contacts 97 and 98.

When the switch LS2 is in the condition shown in FIG. 11, closure of switch LS3 completes a circuit through the solenoid coil 95 and shifts the valve spool 105 to the left to admit air into the motor 83 through the line 94 and rotate the sleeve 75 and the gripper 71 counterclockwise into the position shown in FIG. 10 in which the detent 84 abuts against the stop 85. So long as the feeler switch LS1 remains open, indicating that each blank 11 on the shuttle 30 is properly oriented for insertion in the chuck 12, subsequent closure of switch LS3 during each machine cycle has no effect on the gripper and the blanks are transferred to the chuck without being turned. When the larger end portion 25 of a blank engages the feeler plate, however, the switch LS1 is closed and immediately energizes the solenoid 100 to index the ratchet wheel 102 one step and thereby reverse the two pole switch LS2. This conditions the circuit for energization of the coil 96 the next time switch LS3 closes.

Preferably, the closing of switch LS3 is timed to occur when the transfer device 31 is between its retracted and extended positions, the cam 68 being shaped to produce a dwell in the forward motion of the carrier arm 65 when the gripper is in an intermediate position. During this dwell, the switch LS3 closes and completes the circuit to the solenoid to operate the valve 91, actuate the motor 83 and turn the gripper clockwise until the detent 84 abuts against the stop 87. Again, the gripper remains in this angular position until the feeler 29 detects the presence of a disoriented blank on the shuttle and prepares the circuit for end-for-end rotation of the blank by the transfer device 31.

I claim as my invention:

1. In a mechanism for orienting elongated generally cylindrical parts having coaxial opposite end portions of different diameters, the combination of, a base; a transfer device mounted on said base for movement from a receiving position to an extended position, said device having a carrier, a gripper for holding a part with the longitudinal axis of the part in a predetermined position, and means mounting said gripper on said carrier for rotation about an axis perpendicular to the axis of the part; mechanism for delivering successive parts sidewise to said receiving position for insertion in said gripper; a feeler disposed along the path followed by one end portion of the part during the sidewise motion of the parts and having a nose normally positioned for engagement with the end portions of larger diameter passing the feeler but spaced from the end portions of smaller diameter passing the feeler; means mouting said feeler on said base for movement out of the normal position and away from said path in response to engagement of said nose with an end portion of the larger diameter; and means operable in response to such movement of the feeler to rotate said gripper 180 degrees after insertion of the part therein thereby to turn the part end for end.

2. In a mechanism for orienting elongated parts having opposite end portions of different configuration, the combination of, a base; a transfer device mounted on said base for back and forth movement between a receiving position and an extended position, said device having a carrier, a gripper for holding a part with the longitudinal axis of the part in a predetermined position, and means mounting said gripper on said carrier for rotation about an axis perpendicular to the axis of the part; mechanism for delivering successive parts sidewise to said receiving position for insertion in said gripper, a feeler disposed along the path followed by one end portion of each part for detecting which of said opposite end portions is moving along said path; and means actuated by said feeler in response to movement of a predetermined end portion along said path and operable to rotate said gripper 180 degrees after insertion of the part to turn the part therein end for end and reverse the relation of said ends.

3. The combination defined in claim 2 in which said delivering mechanism includes a shuttle movable back and forth between said receiving position and a laterally spaced loading position and formed with a seat for carrying parts sidewise to said receiving position, said feeler being mounted along the path of an end portion of parts on said shuttle for engagement with end portions of one configuration only and for movement away from said path in response to such engagement.

4. The combination defined in claim 3 further including a switch actuated by such movement, and a control circuit conditioned by actuation of said switch for rotation of said gripper after the part is in said gripper.

5. The combination defined in claim 3 including means supporting said feeler on said base for selective adjustment toward and away from said shuttle.

6. In a mechanism for orienting elongated parts having opposite end portions of different configuration, the combination of, a base; a transfer device mounted on said base for movement from a receiving position to an extended position, said device having a carrier, a gripper for holding a part with the longitudinal axis of the part in a predetermined position, and means mounting said gripper on said carrier for rotation about an axis perpendicular to the axis of the part; mechanism for delivering successive parts to said gripper in said receiving position for movement of the parts to said extended position; a feeler for detecting the relative positions of said end portions prior to movement of said device to said extended position; and means actuated by said feeler when said end portions are in a predetermined relation and operable to rotate said gripper 180 degrees after insertion of the part to turn the part therein end for end and reverse the relation of said ends.

7. In a mechanism for orienting elongated parts having opposite end portions of different configuration, the combination of, a base; a transfer device mounted on said base for movement from a receiving position to an extended position, said device having a carrier, a gripper for holding a part with the longitudinal axis of the part in a predetermined position, and means mounting said gripper on said carrier for rotation about an axis perpendicular to the axis of the part; mechanism for delivering successive parts to said gripper in said receiving position for movement of the parts to said extended position; a feeler for detecting the relative positions of said end portions prior to movement of said device to said extended position; and means actuated by said feeler when said end portions are in a predetermined relation and operable to rotate said gripper through a preselected arc after insertion of the part to turn and orient the part.

References Cited by the Examiner
UNITED STATES PATENTS

| | | | |
|---|---|---|---|
| 1,832,165 | 11/1931 | Wilcox | 221—233 XR |
| 2,580,472 | 1/1952 | Smith | 214—147 |
| 2,791,316 | 5/1957 | Mullan | 198—33 |

MARVIN A. CHAMPION, *Primary Examiner.*